United States Patent [19]
Batani et al.

[11] Patent Number: 5,346,029
[45] Date of Patent: Sep. 13, 1994

[54] METHOD AND APPARATUS FOR HOLDING AN ASSEMBLY FOR MOUNTING ON STRUCTURAL PARTS

[75] Inventors: Hassan Batani, München; Axel Temmesfeld, Raubling; Eduard Greindl, München, Fed. Rep. of Germany

[73] Assignee: BMW AG, Munich, Fed. Rep. of Germany

[21] Appl. No.: 847,081

[22] PCT Filed: Aug. 3, 1991

[86] PCT No.: PCT/EP91/01468
§ 371 Date: Apr. 13, 1992
§ 102(e) Date: Apr. 13, 1992

[87] PCT Pub. No.: WO92/03305
PCT Pub. Date: Mar. 5, 1992

[30] Foreign Application Priority Data
Aug. 14, 1990 [DE] Fed. Rep. of Germany ....... 4025661

[51] Int. Cl.$^5$ .............................................. B60K 11/04
[52] U.S. Cl. .................................. 180/68.4; 248/213.3
[58] Field of Search ................ 180/68.4, 68.5; 165/67, 165/68; 248/213.3, 213.4, 221.3, 221.4; 403/319, 326

[56] References Cited

U.S. PATENT DOCUMENTS 5,106,143  4/1992  Soeters ..................... 248/221.4 X

FOREIGN PATENT DOCUMENTS

| | | |
|---|---|---|
| 0117976 | 9/1984 | European Pat. Off. . |
| 0226914 | 7/1987 | European Pat. Off. . |
| 0226914B1 | 1/1989 | European Pat. Off. . |
| 0335124 | 10/1989 | European Pat. Off. . |
| 765899 | 5/1954 | Fed. Rep. of Germany . |
| 2409822 | 7/1975 | Fed. Rep. of Germany . |
| 3716099 | 1/1988 | Fed. Rep. of Germany . |
| 3906616 | 10/1989 | Fed. Rep. of Germany . |
| 3901193 | 2/1990 | Fed. Rep. of Germany ..... 180/68.4 |
| 4028250 | 10/1991 | Fed. Rep. of Germany ..... 180/68.4 |
| 2531568 | 2/1984 | France ............................ 180/68.4 |
| 2132951 | 7/1984 | United Kingdom .............. 180/68.4 |
| 2173250 | 10/1986 | United Kingdom . |

OTHER PUBLICATIONS

Patent Abstracts of Japan, vol. 9, No. 9 (M-375) Apr. 27, 1985—Setting Structure for Garnish.

Primary Examiner—Brian L. Johnson
Attorney, Agent, or Firm—Evenson, McKeown, Edwards & Lenahan

[57] ABSTRACT

An arrangement for holding of assembly that can be mounted on structural parts, particularly of a radiator module on the body of motor vehicles. Connecting elements used for holding the assembly are constructed to be guided to the structural part while interacting in a self-locking manner with the structural part.

12 Claims, 1 Drawing Sheet

METHOD AND APPARATUS FOR HOLDING AN ASSEMBLY FOR MOUNTING ON STRUCTURAL PARTS

BACKGROUND AND SUMMARY OF THE INVENTION

This invention relates to a method and apparatus for holding an assembly that can be mounted on structural parts, particularly for mounting a radiator module on the body of a motor vehicle.

For mounting an assembly on structural parts, numerous types of connecting elements are known which act between the above-mentioned devices. Thus, for example, European Patent Document EP-B-0 226 914 shows and describes a radiator fastening system in a motor vehicle in which supporting brackets extending under the radiator or the radiator module are used as connecting elements of the support holding device with respect to the body of the motor vehicle. These supporting brackets are of a type which must be arranged separately on the vehicle body before the installation of the radiator module. Only then may the radiator module be arranged by means of elastic elements on the supporting brackets for installation in the vehicle body. This known arrangement for the mounting of an assembly, particularly of a radiator module, on the body of motor vehicles, is costly.

Furthermore, this known arrangement is not suitable for a production process in which assemblies or assembly groups for the connection with the body of a motor vehicle are guided automatically to the vehicle body by way of mounting frames or mounting assembly carriers, as shown for example in the German Patent Document DE-A-39 06 616 or the European Patent Document EP-B-0 226 914.

The object of the present invention is to provide an arrangement for, therefore, mounting an assembly on structural parts by means of a connecting element, with the latter being guided in the mounting direction of the assembly (relative to the respective structural part) and being connected with the structural part for its arrangement.

By means of the self-locking arrangement of the connecting elements according to the invention a simple mounting is achieved which applies particularly advantageously to connecting elements connected with the assembly. Furthermore, the method and apparatus according to the invention impose no limitation with respect to the mounting direction. In a first advantageous embodiment of the invention, guides, which are arranged on structural parts, interact with the connecting elements. These guides are advantageously used for the moving the assembly into its final installed position, in which it is secured by the self-locking of the connecting elements with the guides. The combination of the connecting element, the guide and the self-locking is particularly advantageous for a mounting of assemblies carried out by robots.

A connecting element, which is particularly well suited for automatic mounting, has a self-locking supporting bracket which interacts with structure-side guides in the form of flanges. The supporting bracket is designed as a one-piece plastic preform, and is equipped with tongues which by means of detent noses elastically act on both sides of a flange. The detent noses engage in a through opening of the flange, with the detent noses and the through opening each having detent surfaces arranged transversely to the mounting and loading direction. The combination of the tongues, which elastically act upon each flange, with the detent surfaces arranged as described above, advantageously results in a self-locking arrangement the effect of which increases as the load rises.

In addition, the supporting bracket, for automatic mounting (preferably on a vehicle body), is equipped with a centering device oriented on the vehicle body side which assists in positioning, and an inserting horn for the structure-side or body-side flanges which, in addition, are gripped by guide slots arranged next to the tongues on the supporting bracket. The combination of the centering device and the guide slots provides an additional rotational securing of the supporting brackets relative to the flanges, so that a minimum of apparatus is achieved for the perfect positioning of each console on the vehicle body. Finally, by means of the central arrangement of one detent nose of one tongue between two detent noses of the oppositely arranged tongue engaging from both sides in the through opening of the flange, a division is achieved which advantageously results in a uniform introduction of force into the supporting bracket.

The supporting bracket according to a further embodiment of the invention is preferably used for the holding a radiator module on the body of a motor vehicle. In a process according to the invention for the installation of the radiator module, the self-locking radiator supporting brackets, together with the radiator module, are inserted along a straight path from below into the body of the motor vehicle or are moved in by means of a mounting assembly carrier. Several assemblies may be arranged on the mounting assembly carrier, in which case the radiator module is positioned in its installed position, connected by a connecting hose to a drive assembly arranged on the mounting carrier. Thus, separate devices for fixing the installed position of the radiator module during the installation are eliminated.

Other objects, advantages and novel features of the present invention will become apparent from the following detailed description of the invention when considered in conjunction with the accompanying drawings.

DETAILED DESCRIPTION OF THE DRAWINGS

Figure 1:
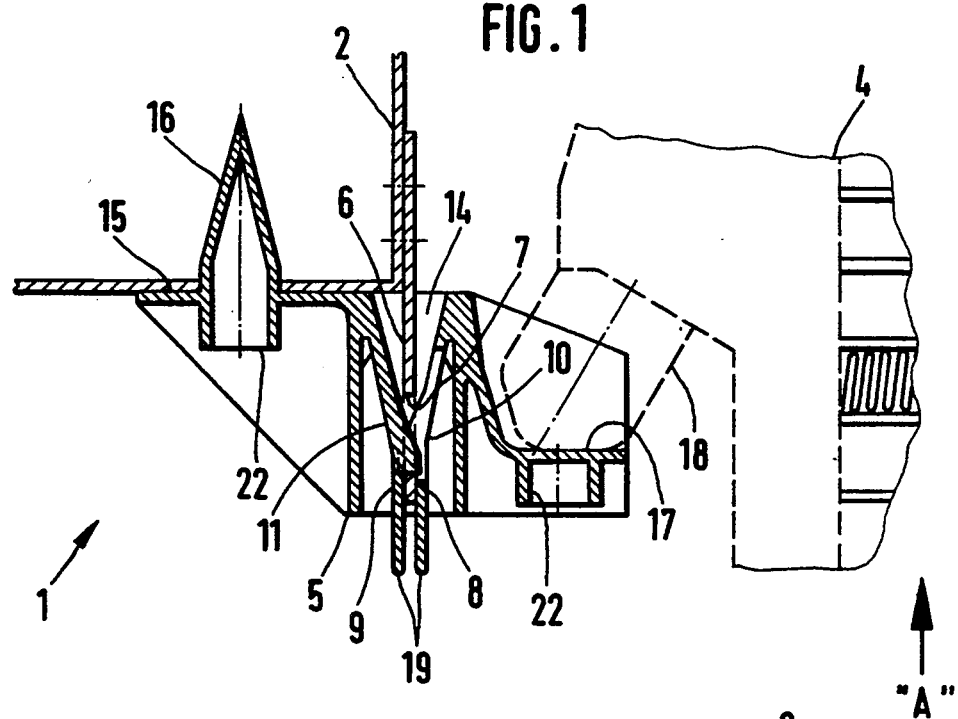
FIG. 1 is a view of an arrangement for the direct holding of a radiator module in its development as a self-centering radiator console.

Referring to FIG. 1, an arrangement 1 for the holding of a radiator module or console 4 which can be mounted on a body 2 of a motor vehicle 3 (FIG. 2), comprises a supporting bracket 5 which serves as a connecting element with respect to the vehicle body 2. In addition, the arrangement 1 comprises a guide, which projects downward on the vehicle body 2, parallel to the assembly mounting direction (arrow "A"), the guide being designed as a flange 6 with a through opening 7. The supporting bracket 5, which is constructed as a one-piece plastic preform, has correspondingly spaced tongues 8, 9 to receive the flange 5. The tongues rest elastically against the flange 6 and have detent noses 10, 11 which automatically engage in the through opening 7 thereof. The detent noses 10, 11 and the boundary of the through opening 7 of the flange 6 facing the detent noses each have detent surfaces arranged transversely to the mounting direction according to the arrow "A". Thus, a self-locking radiator console 6 is created in which the detent effect of the detent noses 10, 11 increases automatically with the rising load by the radiator module 4 in a direction which is opposite to the mounting direction according to arrow "A".

Figure 2:
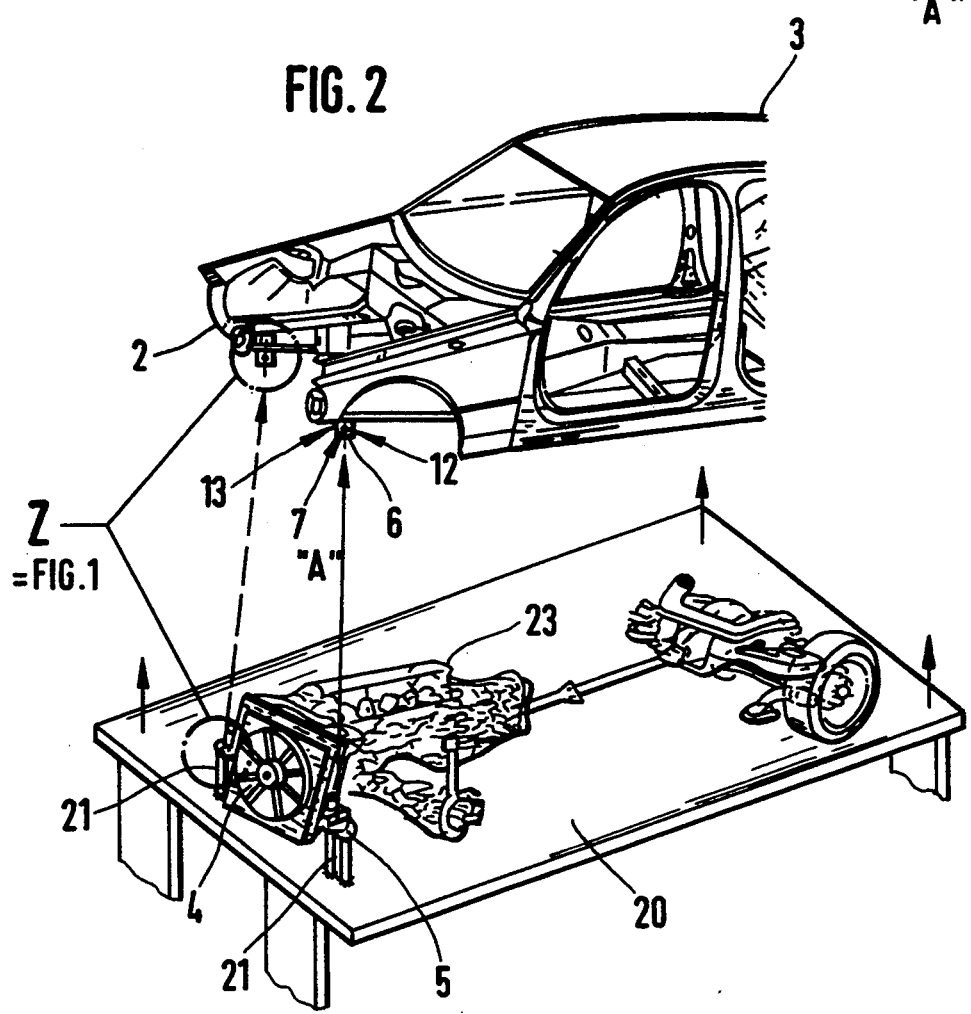
FIG. 2 is a view of the use of the self-centering radiator supporting bracket in a mounting process with a radiator module which can be entered into the body of a motor vehicle from the direction of the underside.

Guide slots (not shown) are arranged in the supporting brackets 5 adjacent to the tongues 8, 9 on both sides and reaching around the edge areas 12, 13 of the bracket 6 (FIG. 2). An inserting horn 14 for the bracket 5 in the console 4 is assigned jointly to the guide slots and to the tongues 8, 9. In the console 4, the inserting horn 14 is arranged between a stop face 15 used for resting against the vehicle body 2 and has a centering device 16 oriented on the body side, and a supporting surface 17 used for supporting the radiator module 4. The radiator module 4 acts upon the supporting surface 17 by way of a rubber-elastic buffer 18.

For achieving a uniform introduction of force into the console, it is provided that one of the tongues 8, 9 of the console 5 has detent noses 10 which are spaced according to the width of the through opening 7 in the bracket 6, and that another detent nose 11 of the other tongue 9 is arranged to be engaging in the through opening between the detent noses 10. Finally, the two tongues 8, 9 may have sections 19, which extend beyond the detent noses 10, 11 and are used for the opening engagement of the self-locking mechanism for removal of the radiator module 4.

A mounting assembly carrier 20 illustrated in FIG. 2 is equipped with two mounting racks 21 on which two supporting brackets 5 are located which reach under the radiator module 4 in its exterior areas. Each supporting bracket 5 has connector sockets 22 on its underside which frictionally engages with corresponding connector pins on each mounting rack 21 to hold the supporting bracket in position. Subsequently, the radiator module 4, by way of the buffers 18, is placed on the supporting surface areas 17 of the consoles 4. Furthermore, a liquid-cooled drive assembly 23 is arranged on the mounting assembly carrier 20 adjacent to the radiator module 4, to which radiator module is connected at least by means of one connecting hose. The radiator module 4 is positioned by this connecting hose relative to the drive assembly 23 and is therefore fixed in its installed position. The radiator module 4 and the drive assembly 23 are then moved in a straight line from below into the vehicle body 2 by means of the mounting assembly carrier 20. In the final stage of the insertion from below, the supporting brackets 5 for holding the radiator module 4 are positioned with respect to the vehicle body 2 by means of the centering devices 16, and are locked in on the flange 6 which freely project downward on the vehicle body 2, by way of detent noses 10, 11 of the tongues 8, 9 which automatically engage in the through openings 7 of the flanges 6.

The self-locking radiator supporting bracket 5 described in FIG. 1, together with the radiator module 4 which can be inserted into a body 2 of a motor vehicle in a straight line, results in a simple, preferably automatic mounting of the radiator module 4. Low mounting costs are in this case achieved by, among others, the fact that the preparatory mounting measures consist only of positioning the two supporting brackets 5 on the mounting racks 21 and placing radiator module 4 on the supporting brackets 5, the installed position of the radiator module 4 is thus achieved by means of a connecting hose of the cooling system of the drive assembly 23, without any additional measures.

Within the scope of the invention, it is also possible to arrange only the supporting brackets 5 from below on the flanges 6 of the vehicle body 2 in a self-locking manner and then arrange the radiator module 4, for example, from above or laterally from above in the vehicle body on the supporting brackets 5. However, the invention is not limited to a standing arrangement of the radiator module; it is also suitable for a suspended arrangement of the radiator module. While the above-mentioned arrangements essentially apply to vertical mounting directions of the radiator module 4, the invention finally also includes such arrangements of the radiator module 4 in which horizontal mounting directions are important.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Process for mounting a first assembly to a second assembly by means of an arrangement of the type comprising:

at least one connecting element, said connecting element having structure for receiving and holding said first assembly, and structure for interlockingly coupling with said second assembly; and structure for guiding said at least one connecting element along a direction that is parallel with a mounting direction of said first assembly, into an interlock position relative to said second assembly;

said structure for interlockingly coupling being adapted to interact with said second assembly in a self locking manner, upon movement of said at least one connecting element along said direction that is parallel with said mounting direction, into said interlock position;

wherein said first assembly is a radiator module and said second assembly is a motor vehicle body, and where said radiator module enters into said vehicle body from an underside thereof;

said process comprising the steps of:

positioning two supporting brackets on a mounting assembly carrier;

positioning said radiator module in an installation position on supporting surfaces of said supporting brackets;

inserting said radiator module into said vehicle body along a straight path, by means of the mounting assembly carrier, said supporting brackets being positioned relative to the vehicle body by way of centering devices; and the supporting brackets being locked on flanges by detent noses, which automatically engage with through openings when said supporting bracket reaches a mounting position.

2. Process according to claim 1, wherein a plurality of said radiator modules and supporting brackets are positioned on said mounting assembly carrier, each of said radiator modules being connected to a liquid cooled assembly, also arranged on said mounting assembly carrier, with said radiator module being positioned by a connecting hose relative to a drive assembly carrier and thus fixed in an installation position.

3. An arrangement for mounting a radiator module on a motor vehicle body by way of relative movement of the radiator module and vehicle body in a substantially linear mounting direction, said arrangement comprising:

at least one body vehicle side flange including at least one through opening, said side flange extending essentially transversely of the mounting direction, and at least one radiator module support bracket having spaced tongues guided along opposite transverse sides of the vehicle side flange during mounting movement in the mounting direction, said tongues being configured to rest elastically against the respective vehicle side flange and including detent noses which self lockingly engage in a spaced relationship within the vehicle side flange through opening.

4. An arrangement according to claim 3, wherein a plurality of said vehicle side flanges are provided for interengagement with a corresponding plurality of support brackets of the radiator module.

5. An arrangement according to claim 3, wherein the at least one support bracket is configured as a separate one-piece plastic preform which also includes:

an inserting horn assigned to respective guide slots and tongues of the support bracket, and a centering part disposed transversely of the inserting horn for centering the support bracket at a countercentering part of the vehicle body.

6. An arrangement according to claim 5, wherein the support bracket includes a stop surface abuttingly engageable with a counter stop surface at the vehicle body side for limiting movement in the mounting direction.

7. The arrangement according to claim 4, wherein the support bracket includes a stop surface abuttingly engageable with a counter stop surface at the vehicle body side for limiting movement in the mounting direction.

8. The arrangement according to claim 4, wherein the support bracket includes a stop surface abuttingly engageable with a counter stop surface at the vehicle body side for limiting movement in the mounting direction.

9. The arrangement according to claim 4, wherein said at least one support bracket spaced tongues includes first tongues with detent noses spaced corresponding to a clear width of the transverse hole and a second tongue with a detent nose disposed between the detent noses of the first tongue.

10. The arrangement according to claim 9, wherein the tongues have extending sections for accommodating unlocking of the mounting arrangement.

11. An arrangement according to claim 3, wherein the tongues have extending sections for accommodating unlocking of the mounting arrangement.

12. An arrangement according to claim 10, wherein a plurality of said vehicle side flanges are provided for interengagement with a corresponding plurality of support brackets of the radiator module.

* * * * *